United States Patent
Ross et al.

(10) Patent No.: US 10,162,842 B2
(45) Date of Patent: Dec. 25, 2018

(54) DATA PARTITION AND TRANSFORMATION METHODS AND APPARATUSES

(71) Applicant: Intel Corporation, Santa Clara, CA (US)

(72) Inventors: Alan D. Ross, Shingle Spring, CA (US); Grant Babb, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 14/593,907

(22) Filed: Jan. 9, 2015

(65) Prior Publication Data

US 2016/0203169 A1    Jul. 14, 2016

(51) Int. Cl.
*G06F 17/30* (2006.01)

(52) U.S. Cl.
CPC .. *G06F 17/30321* (2013.01); *G06F 17/30324* (2013.01); *G06F 17/30598* (2013.01)

(58) Field of Classification Search
CPC ......... G06F 17/30321; G06F 17/30324; G06F 17/30598
See application file for complete search history.

(56) References Cited

U.S. PATENT DOCUMENTS

| | | | |
|---|---|---|---|
| 6,785,240 B1 | 8/2004 | Cao et al. | |
| 7,233,940 B2 * | 6/2007 | Bamberger | G06F 11/006 |
| 2008/0177994 A1 * | 7/2008 | Mayer | G06F 9/4418 |
| | | | 713/2 |
| 2010/0165859 A1 | 7/2010 | Carruzo et al. | |
| 2011/0182180 A1 * | 7/2011 | Riddle | H04L 41/0893 |
| | | | 370/230 |
| 2013/0103713 A1 * | 4/2013 | Woodruff | G06F 17/30 |
| | | | 707/769 |
| 2013/0325825 A1 * | 12/2013 | Pope | G06F 17/30283 |
| | | | 707/700 |
| 2016/0350396 A1 * | 12/2016 | Blanc | G06F 17/30575 |

OTHER PUBLICATIONS

International Search Report and Written Opinion dated Feb. 18, 2016 for International Application No. PCT/US2015/060210, 10 pages.
Abuagla Babiker Mohd et al., "Toward a Flow-based Internet Traffic Classification for Bandwidth Optimization," International Journal of Computer Science and Security (IJCSS), vol. 3, No. 2, pp. 146-153, Apr. 2009.

(Continued)

*Primary Examiner* — Huawen A Peng
(74) *Attorney, Agent, or Firm* — Schwabe, Williamson & Wyatt, P.C.

(57) ABSTRACT

Apparatuses, methods and storage medium associated with processing data are disclosed herewith. In embodiments, an apparatus may include a data pre-processor to partition a collection of scalar data associated with unidirectional relationships of a plurality of two endpoint pairs into a plurality of workloads of directional data associated with the plurality of two endpoint pairs. In embodiment, the partition operation may include partition of the two endpoint pairs into a plurality of bins, where each bin includes a plurality of quantiles of the two endpoint pairs. Other embodiments may be described and/or claimed.

23 Claims, 7 Drawing Sheets

(56) References Cited

OTHER PUBLICATIONS

Dario Rossi et al., "Fine-grained traffic classification with Netflow data," In: Proceedings of the 6th International Wireless Communications and Mobile Computing Conference (IWCMC'10), pp. 479-483, Jun. 28, 2010.
Samuddho Chakravarty et al., "On the Effectiveness of Traffic Analysis Against Anonymity Networks Using Flow Records," Passive and Active Measurement (PAM 2014), LNCS 8362, pp. 247-257, 2014.
Extended European Search Report dated Aug. 14, 2018 for European Patent Application 15877296.2, 8 pages.
Giuseppe Aceto et al., "Efficient Storage and Processing of High-Volume Network Monitoring Data", Jun. 2013, 14 pages, IEEE Transactions on Network and Service Management, vol. 10, No. 2.

\* cited by examiner

DATA PARTITION AND TRANSFORMATION METHODS AND APPARATUSES

TECHNICAL FIELD

The present disclosure relates to the field of data processing. More particularly, the present disclosure relates to a data pre-processor for partitioning and/or transforming a large collection of data (such as netflow records).

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

"Big data" refers to any collection of data sets so large and complex that it becomes difficult to process them using traditional data processing applications. "Big data" is often difficult to work with using traditional relational database management systems, desktop statistics, and/or visualization packages. Instead, massively parallel software running on tens, hundreds, or even thousands of servers are often required.

For example, network flows (aka "netflows", "s-flows") have been a prevalent accounting record of network traffic for over a decade now. Netflow provides information about communications on a network via the following: source Internet Protocol (IP) address, destination IP address, protocol, start time, number of packets and byte count. They have historically been used in the enterprise for network capacity planning and application performance troubleshooting. Over time they've also been recognized as a reasonable method to identify information security threats and attacks. However, as the networks grow larger and larger with increasing number of IP addressable devices, the volume of enterprise or inter-enterprise data have become so large that is impractical to analyze them with traditional data systems/tools. To give an idea of the scale of possible netflow records in an enterprise, it is not uncommon for a Fortune 100 enterprise to generate over 3 Billion netflow records per day at the Internet Service Provider (ISP) layer of the enterprise' network, and the number grows dramatically larger if local area network (intranet) data are included. The problem is further complicated with netflows (and other big data applications) typically having skewed distribution of values (across the IP addresses), due to the nature of the records.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
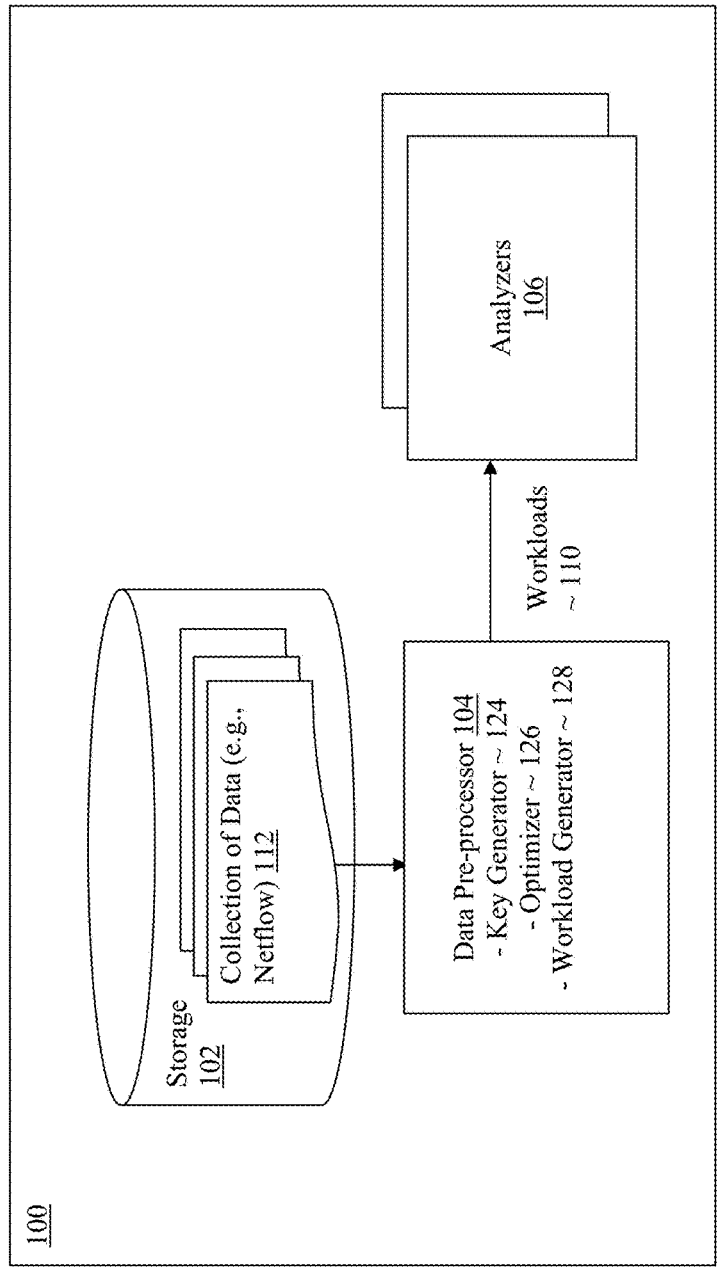
FIG. 1 illustrates a computing arrangement for processing and analyzing big data, according to various embodiments.

Apparatuses, methods and storage medium associated with processing data are disclosed herewith. In embodiments, an apparatus may include a data pre-processor to partition a collection of scalar data associated with unidirectional relationships of a plurality of two endpoint pairs (e.g., netflow data from a source IP address to a destination IP address) into a plurality of workloads of directional data associated with the plurality of two endpoint pairs (e.g., signed time series data of the two IP addresses, with the sign denoting direction). In embodiment, the partition operation may include partition of the two endpoint pairs into a plurality of bins, where each bin includes a plurality of quantiles of the two endpoint pairs.

In embodiments, the apparatus may further include one or more analyzers coupled with the data pre-processor to analyze, in parallel, the workloads (or combinations) having the directional data of the two endpoint pairs.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the term IP address, unless specified otherwise, covers both IPV4 and IPV6 addresses. Further, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a computing arrangement for processing and analyzing big data, according to various embodiments, is shown. As illustrated, computing arrangement 100 may include storage 102, data pre-processor 104 and one or more analyzers 106, coupled with each other as shown. In embodiments, storage 102, data pre-processor 104 and one or more analyzers 106, may be coupled with each other via a plurality of wired and/or wireless, local and or wide area networks (not shown).

Storage 102 may be configured to store a large collection of data 112 to be analyzed, in particular, scalar data of a unidirectional relationship between two endpoints (e.g., netflow records of data (number of bytes or packets) transmitted from a source IP address to a destination IP address). Storage 102 may be one of a number of hierarchical and/or network storage arrangements known in the art, including any combinations of magnetic, optical, and/or solid state storage units.

Data pre-processor 104 may be configured to partition collection of data 112 into a plurality of workloads 110 amendable to parallel processing and/or analysis. In embodiments, data pre-processor 104 may be configured to transform collection of data 112 that are scalar data associated with a unidirectional relationship of two endpoints, into directional data of the endpoint pairs, as part of the partitioning process. In embodiments, data pre-processor 104 may be configured to partition a collection 112 of netflow data from a source IP address to a destination IP address into a plurality of workloads 110 of signed time series data of IP address pairs, with the signs denoting direction of transmission. The data pre-processor 104 may partition and transform the collection 112 of netflow data using a plurality of bins, where each bin includes a plurality of quantiles of the directional data of the two endpoint pairs.

In embodiments, data pre-processor 104 may include key generator 124, optimizer 126 and workload generator 128. In embodiments, key generator 124 may be configured to generate a matrix of index keys for the two endpoint pairs (e.g., netflow IP address pairs, aka channels), and a matrix of partition key tuples. In embodiments where the scalar data are netflow data, the matrix of index keys for a pair of IPV4 addresses (channel) may comprise 64-bit index keys, and the matrix of partition key tuples may comprise 12-bit and 52-bit key pairs. The 64-bit index keys provide an index key space sufficiently large to accommodate the large range of possible IPV4 addresses. In alternate embodiments, the matrix of partition key tuples may comprise 16-bit and 48-bit key pairs or other size combinations derived from the 64-bit index keys. In still other embodiments where the scalar data are netflow data, the matrix of index keys for a pair of IPV6 addresses (channel) may comprise 256-bit index keys, and the matrix of partition key tuples may comprise various key tuples derived from the 256-bit index keys, e.g., a 48-bit, 52-bit, 52-bit, 52-bit and 52-bit partition key tuple, or a 16-bit, 32-bit, 52-bit, 52-bit, 52-bit, and 52-bit partition key tuple. Other combinations are also possible. An example process for creating a matrix of index keys for the endpoint pairs and a matrix of partition key tuples for partitioning a collection of data into workloads that are amenable for parallel processing, according to various embodiments, will be described more fully below with references to FIG. 3.

In embodiments, optimizer 126 may be configured to determine the plurality of bins, and the plurality of quantiles of the bins. An example process for determining a number of bins, each having a number of quantiles, for use to partition the directional data into workloads that are amenable for parallel processing, according to various embodiments, will be described more fully below with references to FIG. 4. Workload generator 128 may be configured to transform and populate the plurality of quantiles of the plurality of bins with the directional data associated with the plurality of two endpoint pairs, using the matrix of index keys and the matrix of partition key tuples, and output the populated quantiles of the plurality of bins as workloads 110 amenable to parallel processing by analyzer(s) 106. An example process for generating the workloads that are amenable for parallel processing, using the determined bins with quantiles, according to various embodiments, will be described more fully below with references to FIG. 5.

In embodiments, data pre-processor 104 may be implemented in hardware, software, or combination thereof. Examples of hardware implementations may include, but are not limited to, application specific integrated circuits (ASIC), or programmable circuits (such as field programmable gate arrays (FPGA)) programmed with the operating logic. Examples of software implementation may include, but are not limited to, implementation in assembler language of the operating processor(s) (not shown), or high level languages, such as C or python, compilable into the machine instructions of the operating processor(s) (not shown).

In embodiments, analyzers 106 may be any number of analyzers known in the art, including, but not limited to, graphical analyzers configured to provide graph analytics for signal and/or pattern analysis, parallelized machine learning engines for single value decomposition, fast fourier transform etc., distributed storage analyzers, and so forth. In embodiments, analyzers 106 may be disposed on tens, hundreds or thousands of servers (not shown).

For ease of understanding, the remaining description will frequently reference netflow records when further describing key generator 124, optimizer 126 and workload generator 128, however, the present disclosure is not limited to transformation and partitioning of netflow records. The present disclosure may be applied to a wide range of big data applications having similar transformation and partition needs, in particular, big data with skewed data distributions, Session Initiation Protocol (SIP) communications between clients, peer to peer application information, and so forth.

Figure 2:
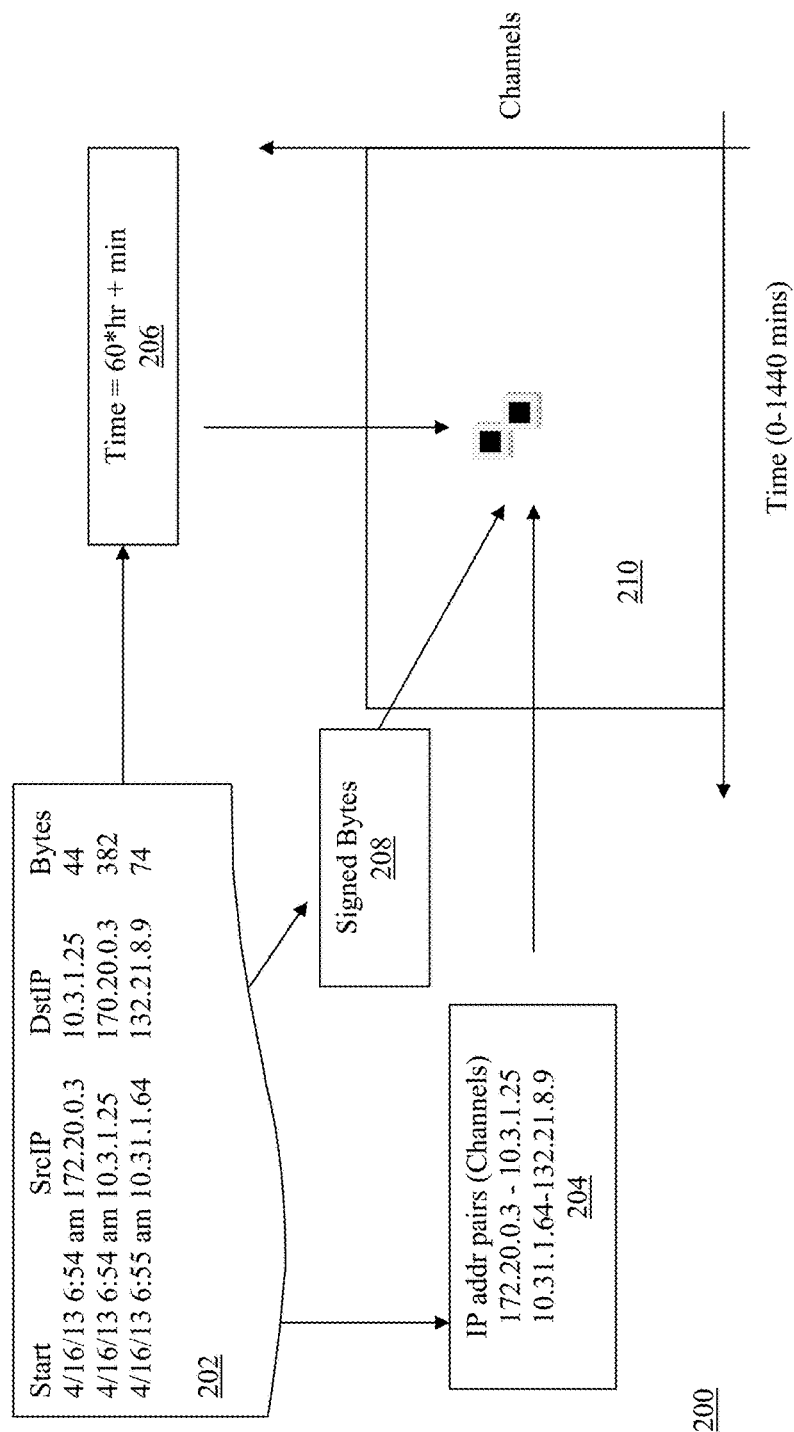
FIG. 2 illustrates an example process for transforming scalar data of a unidirectional relationship of two endpoints into directional data of the two endpoint pair, according to various embodiments.

Referring now to FIG. 2, wherein an example process for transforming scalar data of a unidirectional relationship of two endpoints into directional data of the two endpoint pair, according to various embodiments, is illustrated. As mentioned earlier, for ease of understanding, process 200 for transforming scalar data of a unidirectional relationship of two endpoints into directional data of the two endpoint pair will be presented with example netflow records. The operations may be performed e.g., by earlier described workload generator 128 of FIG. 1. In alternate embodiments, process 200 may be performed with some of the operations omitted, combined, in different order, or other operations added.

As shown, example netflow records 202 may include a number of data transmission records from a number of source IP addresses (SrcIP) to a number of destination IP addresses (DstIP). In addition to the SrcIP and the DstIP, each record may include the start transmission time, and the number of bytes transmitted. In alternate embodiments, each record may include the number packets transmitted or other volume measures instead.

As shown, the scalar data are processed with all two endpoint pairs (aka channels for SrcIP-DstIP pairs) 204 identified, forming the rows of the resulting directional data matrix 210, and the time of transmissions 206 processed to identify the corresponding column positions of the resulting directional data matrix 210. The amount of data transmitted (number of bytes or packets) 208 are placed into the corresponding row/column position of directional data matrix 210 accordingly. Further the data are signed (+or −) to denote the direction of transmission between the two endpoints of the endpoint pairs (between the two IP addresses of the two IP address pairs). Thus, for netflow records, transformed data within data matrix 210, in addition to being directional, are time series data. In other word, for netflow embodiments, as part of the partitioning process, workload generator 218 transforms scalar data of a unidirectional relationship of a SrcIP and a DstIP into time series directional data for the two IP address pair (channel).

Figure 3:
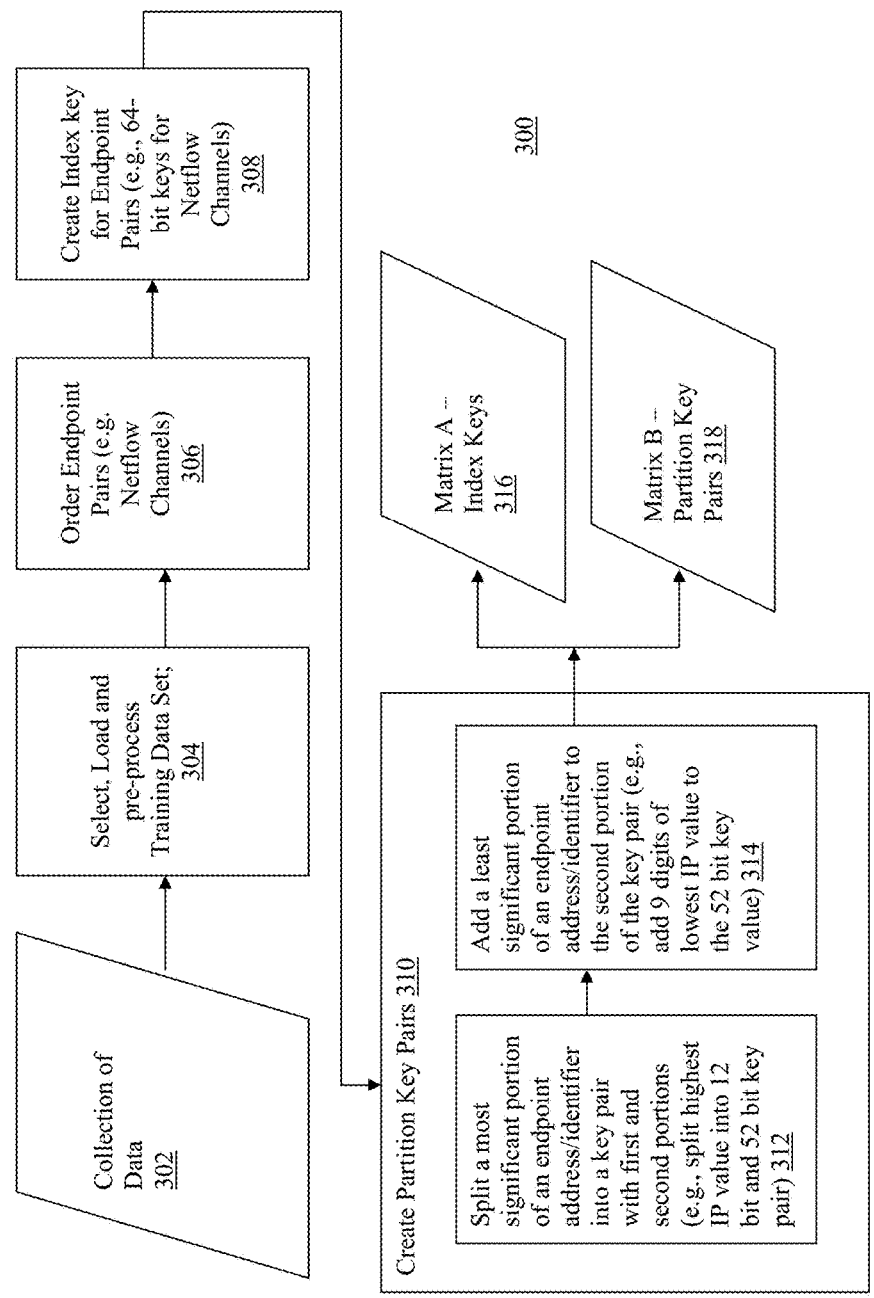
FIG. 3 illustrates an example process for creating a matrix of index keys for the endpoint pairs and a matrix of partition key tuples for partitioning a collection of data into workloads that are amenable for parallel processing, according to various embodiments.

Referring now to FIG. 3, wherein an example process for creating a matrix of index keys for the endpoint pairs and a matrix of partition key tuples for partitioning a collection of data into a plurality of workloads that are amenable for parallel processing, according to various embodiments, is shown. As illustrated, process 300 for creating a matrix of index keys for the endpoint pairs and a matrix of partition key tuples for partitioning the a collection of data into a plurality of workloads that are amenable for parallel processing may include operations performed at blocks 304-314. The operations may be performed e.g., by the earlier described key generator 124 of FIG. 1. In alternate embodiments, process 300 may be performed with some of the operations omitted, combined, in different order, or other operations added.

In embodiments, process 300 may start at block 304. At block 304, a subset of collection of data 302 may be selected and loaded as a training data set for the generation of the matrix of index keys 316 and the matrix of partition key tuples 318. In embodiments, the training data set may be selected through sampling of collection of data 302. For examples, the training data set may be selected through sampling of every other, $5^{th}$ or $10^{th}$ records of collection of data 302 (i.e., 50%, 20% or 10% sampling). For some analysis of netflow records, the training data set may be generated from netflow records of a particular weekday, as representative of the other weekdays. In other words, the size of the training data set, i.e., the amount of sampling, may vary by applications, depending on the desired trade-off between the efficiency of the training process and the effectiveness of the eventual workload parallelization. In general, smaller workloads may require higher sampling rates. Further, less frequent sampling may make approximately equal workloads less likely, but the skewing may be less with fewer workloads. In embodiments, for a data set of scalar data associated with a unidirectional relationship of two endpoints, the training data set may further be pre-processed to identify the endpoint pairs. For netflow records, the IP address pairs may be identified from the various transmission records, e.g. IP1-IP2 address pairs may be identified from transmission of IP1 to IP2 and transmission from IP2 to IP1. In embodiments, the unique endpoint pairs (IP address pairs) may be selected using parallel queries (e.g., a MapReduce program).

Next at block 306, the endpoint pairs may be ordered. For netflow records, the IP address pairs may be ordered in descending order, starting with the largest IP addresses.

At block 308, index keys for the endpoint pairs may be created. For netflow records with IPV4 addresses, 64-bit index keys may be generated for the IPV4 address pairs (channels), to provide a sufficiently large index space to accommodate all possible IPV4 addresses. In embodiments, the 64-bit index keys may be generated by combining the two 4-byte IPV4 addresses as unsigned 32-bit integers. In embodiments, some of the least significant bits may be omitted, (e.g., the last 7 bits). For netflow records with IPV6 addresses, 256-bit index keys may be generated for the IPV6 address pairs (channels), to provide a sufficiently large index space to accommodate all possible IPV6 addresses. In embodiments, the 256-bit index keys may be generated by combining the two 16-byte IPV6 addresses as unsigned 128-bit integers.

At block 310, the partition key tuples may be generated. In embodiments, the partition key tuples may be generated from the attributes (such as addresses/identifiers) of the endpoint pairs by splitting a most significant portion of the addresses/identifiers into two portions, first portion and second portion, at block 312. For example, for various netflow embodiments with 4 part IPV4 addresses, initial 12-bit and 52-bit partition key pairs may be generated by first splitting the highest part of the IP addresses (i.e., using the first octet and part of the second octet). Then, a least significant portion of the attributes (such as addresses/identifiers) of the endpoint pairs may be added to the second portion of the partition key pair, at block 314. For example, for various netflow embodiments with 4 part IPV4 addresses, 9 digits of the lowest part of the IP addresses may be added to the 52-bit portion of the partition key pair. As described earlier, in alternate embodiments, 16-bit and 48-bit partition key pairs may be generated for IPV4 addresses instead. For IPV6 addresses, 256-bit index keys may be generated, and the partition key tuples may be a 48-bit, 52-bit, 52-bit, 52-bit and 52-bit partition key tuple, or a 16-bit, 32-bit, 52-bit, 52-bit, 52-bit and 52-bit partition key tuple, and so forth.

Resultantly, a matrix of index keys 316 and a matrix of partition key tuples 318 may be generated.

Figure 4:
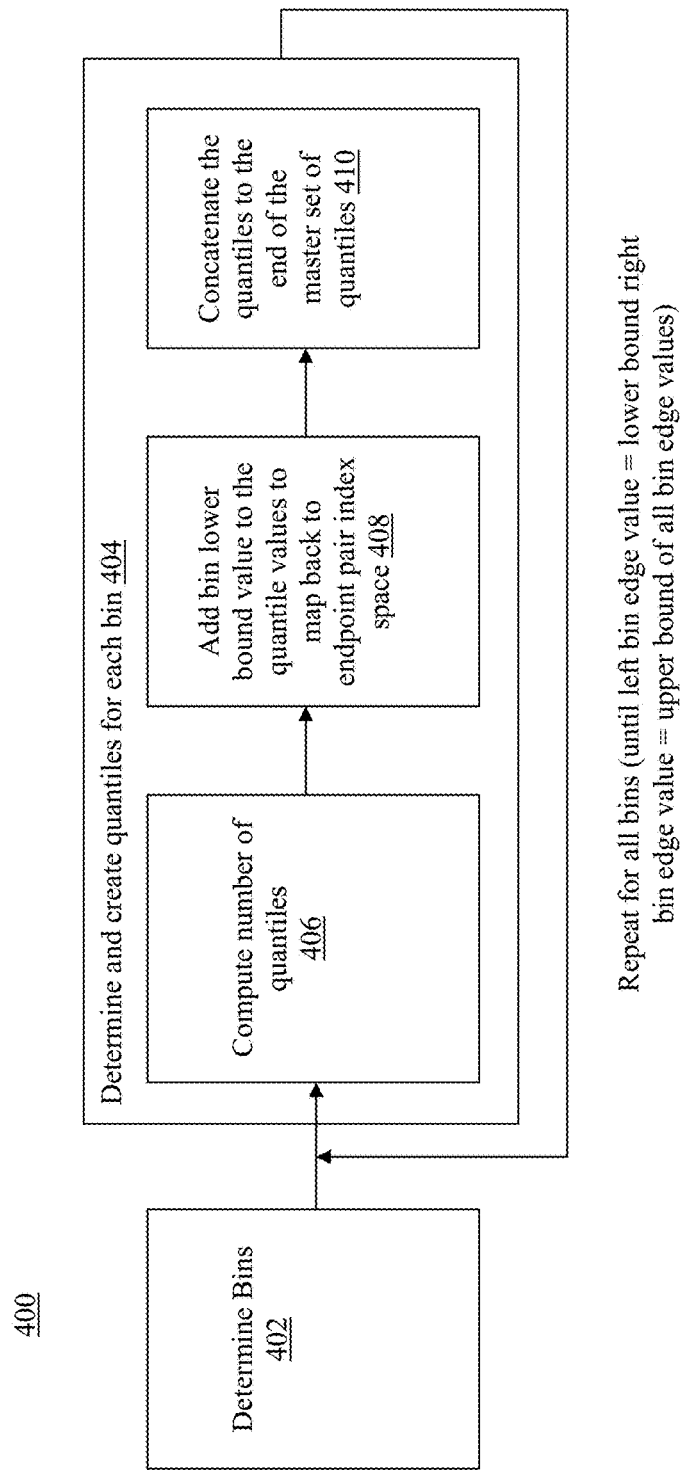
FIG. 4 illustrates an example process for determining a number of bins, each having a number of quantiles, for use to partition the directional data into workloads that are amenable for parallel processing, according to various embodiments.

Referring now to FIG. 4, wherein an example process for determining a number of bins, each having a number of quantiles, for use to partition the entire collection of scalar data into workloads that are amenable for parallel processing, according to various embodiments, is shown. As illustrated, process 400 for determining a number of bins, each having a number of quantiles, for use to partition the entire collection of scalar data into workloads that are amenable for parallel processing, may include operations performed at blocks 402-410. The operations may be performed e.g., by the earlier described optimizer 126 of FIG. 1. In alternate embodiments, process 400 may be performed with some of the operations omitted, combined, in different order, or other operations added.

In embodiments, process 400 may start at block 402. At block 402, the bins the entire collection scalar data to be partitioned into may be determined. In embodiments, the bins may be determined by partitioning the range of index values into a plurality of ranges. In various neflow embodiments, the range of index values may be partitioned into 2^8 or 2^16 ranges, providing 2^8 or 2^16 bins.

Next at block 404, the quantiles may be determined and created for each bin. First, at block 406, the number of quantiles may be computed for the various bins. In embodiments, the number of quantiles m_{q, j} for bin j may be computed by computing m_{q, j}=hist$_j$/q, where hist$_j$= data record counts from histogram for bin j and q=desired data record counts in each quantile. Then at block 408, the bin lower bound value may be added to the quantile values to map back to the endpoint pair index space. Thereafter, at block 410, the quantiles may be concatenated to the end of a master set of quantiles. The operations of block 406-410 may be repeated for each bin; in embodiments, that is when the left bin edge value is equal to lower bound right bin edge and equal to the upper bound of all bin edge values.

Figure 5:
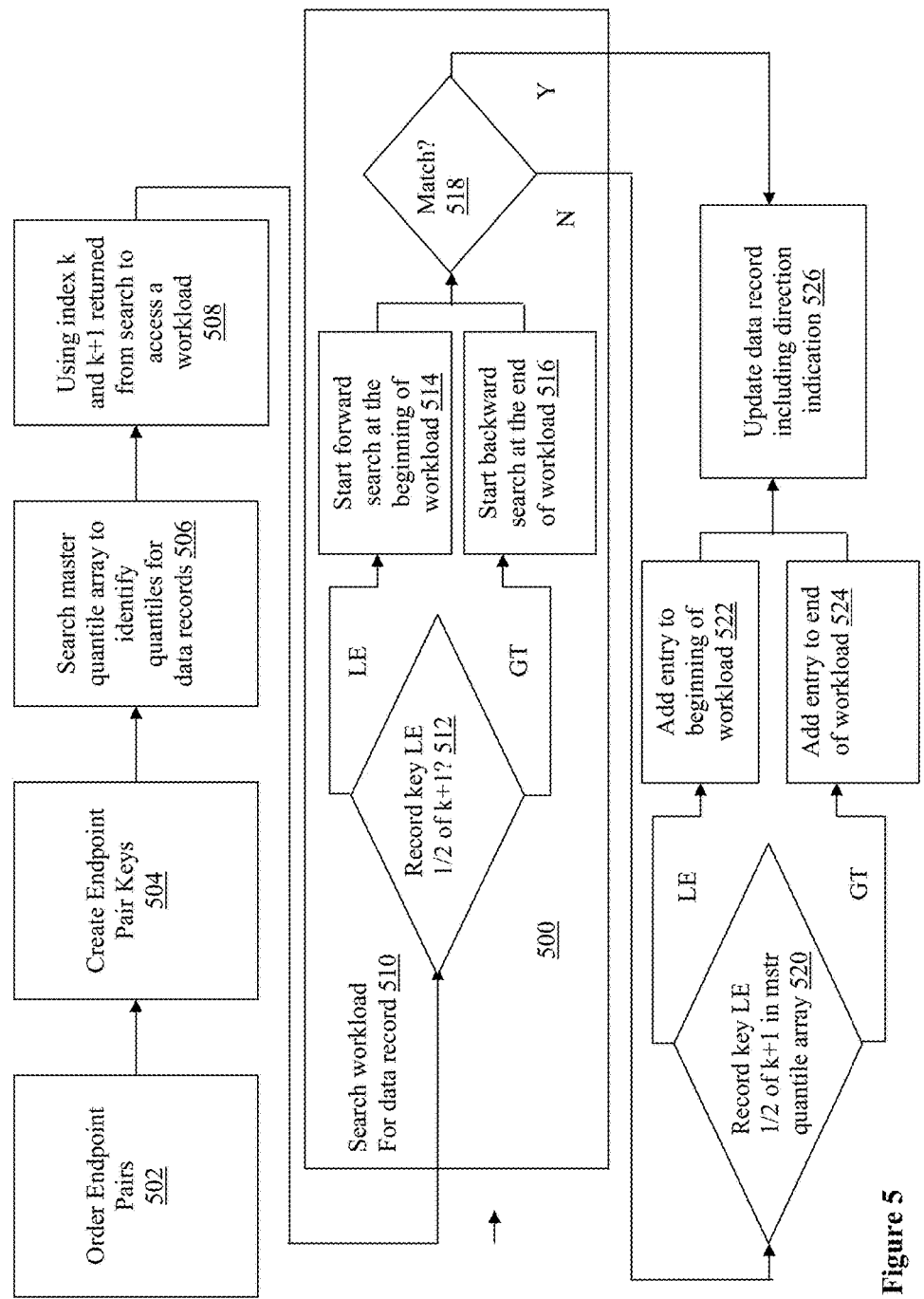
FIG. 5 illustrates an example process for generating the workloads that are amenable for parallel processing, using the determined bins with quantiles, according to various embodiments.

Referring now to FIG. 5, wherein an example process for generating the workloads that are amenable for parallel processing, using the determined bins with quantiles, according to various embodiments, is shown. As illustrated, process 500 for generating the workloads that are amenable for parallel processing, using the determined bins with quantiles, may include operations performed at blocks 502-506. The operations may be performed e.g., by the earlier described workload generator 128 of FIG. 1. In alternate embodiments, process 500 may be performed with some of the operations omitted, combined, in different order, or other operations added.

In embodiments, process 500 may start at block 502. At block 502, the endpoint pairs may be ordered. For the netflow embodiments, the IP address pairs may be ordered in descending order. Next at block 504, index keys may be created for the endpoint pairs, as earlier described.

At block 506, the master quantile array may be searched to identify the corresponding quantiles to store the data records, using the index keys of the endpoint pairs. In embodiments, the search may be performed employing the binary search method.

At block 508, a workload may be accessed using index k and k+1 returned from the search performed at block 506, as upper and lower bounds.

At block 510, the accessed workload may be searched for the data record. In embodiments, at block 512, a determination may be made whether the index of the data record is less than or equal to (LE) ½ of index k+1. If the index of the data record is LE ½ of index k+1, at block 514, a forward search for the data record from the beginning of the workload may be performed. On the other hand, if the index of the data record is greater than (GT) ½ of index k+1, a backward search for the data record from the end of the workload may be performed. Next at block 518, a determination may be made as to whether a match of the data record was found.

If a match of the data record was not found, at block 520, a repeat determination may be made on whether the index of the data record is LE ½ of index k+1 in the master quantile array. If the index of the data record is LE ½ of index k+1 in the master quantile array, at block 522, the data record may be added to the beginning of the workload. On the other hand, if the index of the data record is GT ½ of index k+1 in the master quantile array, the data record may be added to the end of the workload. In alternate embodiments, the result of the determination at block 512 may be stored (e.g., via a flag), and the repeat determination at block 520 may be made through examination of the stored information (e.g., the flag setting).

Next, at block 526, the data of the added data record may be updated including directional indication. In netflow embodiments, the amount of data transmitted may be multiplied with +1 or −1 to denote the direction.

Back at block 518, if a match of the data record was found, process 500 may proceed directly to block 526 with the data record updated, including the directional indication.

Figure 6:
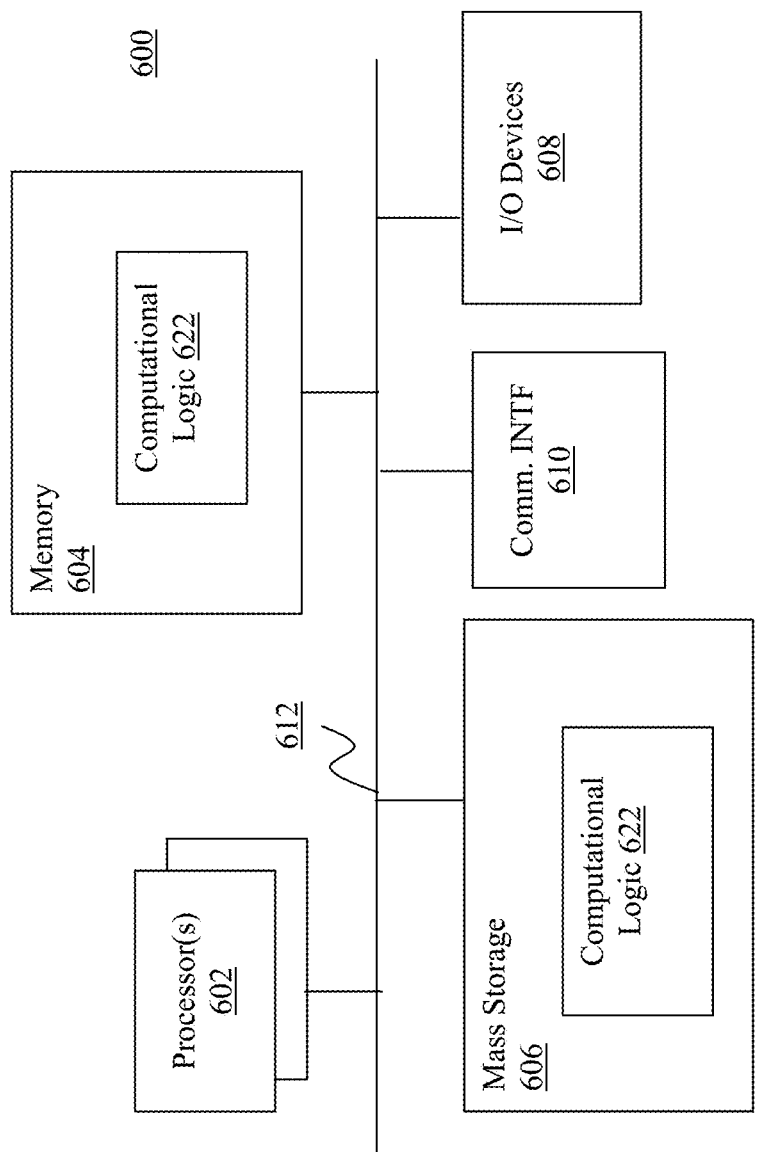
FIG. 6 illustrates an example computing system suitable for use to practice aspect of the present disclosure, according to various embodiments.

Referring now to FIG. 6, wherein an example computer system suitable for practicing aspects of the present disclosure, according to various embodiments, is shown. As illustrated, computer system 600 may include one or more processors 602 and system memory 604. Each processor 602 may include one or more processor cores. System memory 604 may include non-persistent copies of the operating system and various applications, including in particular, data pre-processor 104 (or aspects thereof) and/or analyzers 106 of FIG. 1, collectively denoted as computational logic 622. Additionally, computer system 600 may include one or more mass storage devices 606, input/output devices 608, and communication interfaces 610. The elements 602-610 may be coupled to each other via system bus 612, which may represent one or more buses. In the case of multiple buses, they may be bridged by one or more bus bridges (not shown).

Mass storage devices 606 may include persistent copies of computational logic 622. Mass storage devices 606 may also be employed to store collection of data 112. Examples of mass storage devices 606 may include, but are not limited to, diskettes, hard drives, compact disc read only memory (CD-ROM) and so forth. Examples of communication interfaces 610 may include, but are not limited to, wired and/or wireless network interface cards, modems and so forth. Communication interfaces 610 may support a variety of wired or wireless communications including, but are not limited, 3G/4G/6G, WiFi, Bluetooth®, Ethernet, and so forth. Examples of input/output devices 608 may include keyboard, cursor control, touch-sensitive displays, and so forth.

Except for computing logic 622, each of these elements 602-618 may perform its conventional functions known in the art. The number, capability and/or capacity of these elements 602-618 may vary, depending on the size of data 112 to be transformed, partitioned, and analyzed. Otherwise, the constitutions of elements 602-618 are known, and accordingly will not be further described.

Figure 7:
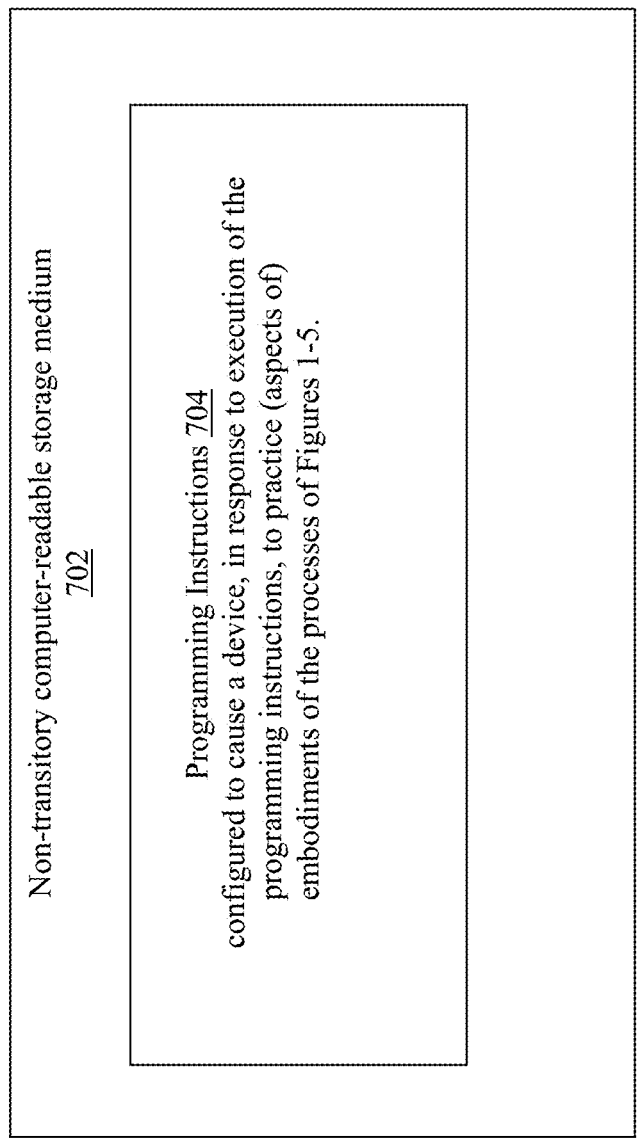
FIG. 7 illustrates a storage medium having instructions for practicing methods described with references to FIGS. 1-5, according to disclosed embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., computer system 600, in response to execution of the programming instructions, to perform, e.g., various operations associated with data pre-processor 104. In alternate embodiments, programming instructions 704 may be disposed on multiple computer-readable non-transitory storage media 702 instead. In alternate embodiments, programming instructions 704 may be disposed on computer-readable transitory storage media 702, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of processors 602 may be packaged together with memory having data pre-processor 104. For one embodiment, at least one of processors 602 may be packaged together with memory having eye tracker 104 to form a System in Package (SiP). For one embodiment, at least one of processors 602 may be integrated on the same die with memory having data pre-processor 104. For one embodiment, at least one of processors 602 may be packaged together with memory having data pre-processor 104 to form a System on Chip (SoC).

Thus various example embodiments of the present disclosure have been described including, but are not limited to:

Example 1 may be an apparatus for processing data. The apparatus may include one or more processors; and a data pre-processor operated by the one or more processors to partition a collection of scalar data associated with unidirectional relationships of a plurality of two endpoint pairs into a plurality of workloads of directional data associated with the plurality of two endpoint pairs, wherein partition may include partition of the two endpoint pairs into a plurality of bins, where each bin includes a plurality of quantiles of the two endpoint pairs.

Example 2 may be example 1, wherein the data pre-processor may include a key generator to generate a matrix of index keys for the two endpoint pairs, and a matrix of partition key pairs for the index keys, based at least in part on a training data set derived from the collection of scalar data.

Example 3 may be example 2, wherein the key generator may generate the index keys based on attributes of the endpoint pairs, and generate the partition key pairs from selected portions of the attributes of the endpoint pairs.

Example 4 may be example 2, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; and wherein an endpoint pair may include a pair of IP addresses.

Example 5 may be example 4, wherein the IP addresses may be IPV4 addresses, and the key generator may generate a matrix of 64-bit index keys from the IPV4 addresses of the IPV4 address pair, using the IPV4 addresses of the IPV4 address pair as unsigned 32-bit integers.

Example 6 may be example 5, wherein an IPV4 address may include 4 ordered parts, and the key generator may further generate a matrix of 12-bit and 52-bit partition key pairs, from highest and lowest ordered parts of the IPV4 addresses of the IPV4 address pair.

Example 7 may be any one of examples 1-6, wherein the data pre-processor may include an optimizer to determine the plurality of bins, and the plurality of quantiles of the bins.

Example 8 may be example 7, wherein the optimizer may divide a range of index keys of the endpoint pairs into a plurality of sub-ranges to determine the plurality of bins.

Example 9 may be example 7, wherein the optimizer may divide data record counts of a histogram corresponding to a bin by a desired number of record counts in each quantile to determine the plurality of quantiles of the bins.

Example 10 may be example 7, wherein the data pre-processor may further include a workload generator coupled with the optimizer to populate the plurality of workloads, based on the determined bins and quantiles of the bins.

Example 11 may be example 10, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the workload generator may populate the plurality of workloads with time series amount of transmission data of the IP address pairs.

Example 12 may be example 11, wherein the workload generator may further transform the time series amount of transmission data of the IP address pairs into directional time series amount of transmission data of the IP address pair.

Example 13 may be example 10, further comprising one or more analyzers coupled with the data pre-processor, to be operated by the one or more processors, to analyze, in parallel, the workloads having the directional data of the two endpoint pairs.

Example 14 may be example 13, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the one or more analyzers may generate a plurality of graphics analytics for the IP address pairs, based at least in part on the time series amount of transmission data in the workloads, for signal or pattern analysis.

Example 15 may be a method for processing data. The method may include receiving, by a computing device, a collection of scalar data associated with unidirectional relationships of a plurality of two endpoint pairs; and partitioning, by the computing device, the collection of scalar data into a plurality of workloads of directional data associated with the plurality of two endpoint pairs; wherein partitioning may include partitioning the two endpoint pairs into a plurality of bins, where each bin includes a plurality of quantiles of the two endpoint pairs.

Example 16 may be example 15, wherein partitioning may include generating a matrix of index keys for the two endpoint pairs, and a matrix of partition key pairs for the index keys, based at least in part on a training data set derived from the collection of scalar data.

Example 17 may be example 16, wherein generating may include generating the index keys based on attributes of the endpoint pairs, and generating the partition key pairs from selected portions of the attributes of the endpoint pairs.

Example 18 may be example 16, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; and wherein an endpoint pair may include a pair of IP addresses.

Example 19 may be example 18, wherein the IP addresses are IPV6 addresses, and generating may include generating a matrix of 256-bit index keys from the IPV6 addresses of the IPV6 address pair, using the IPV6 addresses of the IPV6 address pair as unsigned 128-bit integers.

Example 20 may be example 19, wherein an IPV6 address may include a plurality of ordered parts, and generating further may include generating a matrix of partition key tuples, from highest and lowest ordered parts of the IPV6 addresses of the IPV6 address pair.

Example 21 may be any one of examples 15-20, wherein partitioning further may include determining the plurality of bins, and the plurality of quantiles of the bins.

Example 22 may be example 21, wherein determining may include dividing a range of index keys of the endpoint pairs into a plurality of sub-ranges to determine the plurality of bins.

Example 23 may be example 21, wherein determining may include dividing data record counts of a histogram corresponding to a bin by a desired number of record counts in each quantile to determine the plurality of quantiles of the bins.

Example 24 may be example 21, wherein partitioning further may include populating the plurality of workloads, based on the determined bins and quantiles of the bins.

Example 25 may be example 24, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the workload generator may populate the plurality of workloads with time series amount of transmission data of the IP address pairs.

Example 26 may be example 25, wherein populating may include transforming the time series amount of transmission data of the IP address pairs into directional time series amount of transmission data of the IP address pair.

Example 27 may be example 25, further comprising analyzing, in parallel, the workloads having the directional data of the two endpoint pairs.

Example 28 may be example 27, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the one or more analyzers may generate a plurality of graphics analytics for the IP address pairs, based at least in part on the time series amount of transmission data in the workloads, for signal or pattern analysis.

Example 29 may be one or more computer-readable medium having stored therein a plurality of instructions to cause a computing device, in response to execution of the instructions by the computing device, to: receive a collection of scalar data associated with unidirectional relationships of a plurality of two endpoint pairs; and partition the collection of scalar data into a plurality of workloads of directional data associated with the plurality of two endpoint pairs; wherein partition may include partition of the two endpoint pairs into a plurality of bins, where each bin includes a plurality of quantiles of the two endpoint pairs.

Example 30 may be example 29, wherein partition includes generation of a matrix of index keys for the two endpoint pairs, and a matrix of partition key pairs for the index keys, based at least in part on a training data set derived from the collection of scalar data.

Example 31 may be example 30, wherein generation may include generation of the index keys based on attributes of the endpoint pairs, and generation of the partition key pairs from selected portions of the attributes of the endpoint pairs.

Example 32 may be example 30, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; and wherein an endpoint pair may include a pair of IP addresses.

Example 33 may be example 32, wherein the IP addresses are IPV4 addresses, and the key generator may generate a matrix of 64-bit index keys from the IPV4 addresses of the IPV4 address pair, using the IPV4 addresses of the IPV4 address pair as unsigned 32-bit integers.

Example 34 may be example 33, wherein an IPV4 address may include 4 ordered parts, and generation may include generation of a matrix of 12-bit and 52-bit partition key pairs, from highest and lowest ordered parts of the IPV4 addresses of the IPV4 address pair.

Example 35 may be any one of examples 29-34, wherein partition includes determination of the plurality of bins, and the plurality of quantiles of the bins.

Example 36 may be example 35, wherein determination may include division of a range of index keys of the endpoint pairs into a plurality of sub-ranges to determine the plurality of bins.

Example 37 may be example 35, wherein determination may include division of data record counts of a histogram corresponding to a bin by a desired number of record counts in each quantile to determine the plurality of quantiles of the bins.

Example 38 may be example 35, wherein partition includes population of the plurality of workloads, based on the determined bins and quantiles of the bins.

Example 39 may be example 38, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the workload generator may populate the plurality of workloads with time series amount of transmission data of the IP address pairs.

Example 40 may be example 39, wherein the workload generator may further transform the time series amount of transmission data of the IP address pairs into directional time series amount of transmission data of the IP address pair.

Example 41 may be example 38, the computing device is further causes to analyze, in parallel, the workloads having the directional data of the two endpoint pairs.

Example 42 may be example 41, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the one or more analyzers may generate a plurality of graphics analytics for the IP address pairs, based at least in part on the time series amount of transmission data in the workloads, for signal or pattern analysis.

Example 43 may be an apparatus for processing data. The apparatus may include means for receiving a collection of scalar data associated with unidirectional relationships of a plurality of two endpoint pairs; and means for partitioning the collection of scalar data into a plurality of workloads of directional data associated with the plurality of two endpoint pairs; wherein means for partitioning may include mean for partitioning the two endpoint pairs into a plurality of bins, where each bin includes a plurality of quantiles of the two endpoint pairs.

Example 44 may be example 43, wherein means for partitioning may include means for generating a matrix of index keys for the two endpoint pairs, and a matrix of partition key pairs for the index keys, based at least in part on a training data set derived from the collection of scalar data.

Example 45 may be example 44, wherein means for generating may include means for generating the index keys based on attributes of the endpoint pairs, and means for generating the partition key pairs from selected portions of the attributes of the endpoint pairs.

Example 46 may be example 44, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; and wherein an endpoint pair may include a pair of IP addresses.

Example 47 may be example 46, wherein the IP addresses are IPV6 addresses, and generating may include generating a matrix of 256-bit index keys from the IPV6 addresses of the IPV6 address pair, using the IPV6 addresses of the IPV6 address pair as unsigned 128-bit integers.

Example 48 may be example 47, wherein an IPV6 address may include a plurality of ordered parts, and means for generating further may include means for generating a matrix of partition key tuples, from highest and lowest ordered parts of the IPV6 addresses of the IPV6 address pair.

Example 49 may be example 43-48, wherein means for partitioning further may include means for determining the plurality of bins, and the plurality of quantiles of the bins.

Example 50 may be example 49, wherein means for determining may include means for dividing a range of index keys of the endpoint pairs into a plurality of sub-ranges to determine the plurality of bins.

Example 51 may be example 49, wherein means for determining may include means for dividing data record counts of a histogram corresponding to a bin by a desired number of record counts in each quantile to determine the plurality of quantiles of the bins.

Example 52 may be example 49, wherein means for partitioning further may include means for populating the plurality of workloads, based on the determined bins and quantiles of the bins.

Example 53 may be example 52, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the workload generator may populate the plurality of workloads with time series amount of transmission data of the IP address pairs.

Example 54 is example 53, wherein means for populating may include means for transforming the time series amount of transmission data of the IP address pairs into directional time series amount of transmission data of the IP address pair.

Example 55 is example 53, further comprising means for analyzing, in parallel, the workloads having the directional data of the two endpoint pairs.

Example 56 is example 55, wherein a unidirectional relationship of a two endpoint pair may include a source and destination relationship of two Internet Protocol, IP, addresses; wherein scalar data associated with a unidirectional relationship of a two endpoint pair may include an amount of data transmitted from a source IP address to a destination IP address; wherein an endpoint pair may include a pair of IP addresses; and wherein the means for analyzing may include means for generating a plurality of graphics analytics for the IP address pairs, based at least in part on the time series amount of transmission data in the workloads, for signal or pattern analysis.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for managing networking, comprising:
one or more processors; and
a data pre-processor operated by the one or more processors to partition a collection of netflow data from a source IP address to a destination IP address of a network into a plurality of workloads of signed time series data of IP address pairs, with signs of the time series data of IP address pairs denoting direction of transmission into a plurality of workloads, wherein partition comprises partition of the netflow data into a plurality of bins, where each bin includes a plurality of quantiles of the IP address pairs;
wherein one or more analyzers are to analyze the bins to assist in managing the network, with at least a plurality of the bins analyzed in parallel;
wherein the data pre-processor includes a key generator to generate a matrix of index keys for the IP address pairs, and a matrix of partition key pairs for the index keys, based at least in part on a training data set derived from the collection of netflow data.

2. The apparatus of claim 1, wherein the key generator is to generate the index keys based on attributes of the IP address pairs, and generate the partition key pairs from selected portions of the attributes of the IP address pairs.

3. The apparatus of claim 1, wherein netflow data of an IP address pair comprises an amount of data transmitted from a source IP address to a destination IP address.

4. The apparatus of claim 1, wherein the IP addresses are IPV4 addresses, and the key generator is to generate a matrix of 64-bit index keys from the IPV4 addresses of the IPV4 address pair, using the IPV4 addresses of the IPV4 address pair as unsigned 32-bit integers.

5. The apparatus of claim 4, wherein an IPV4 address comprises 4 ordered parts, and the key generator is to further generate a matrix of 12-bit and 52-bit partition key pairs, from highest and lowest ordered parts of the IPV4 addresses of the IPV4 address pair.

6. The apparatus of claim 5, wherein the data pre-processor comprises an optimizer to determine the plurality of bins, and the plurality of quantiles of the bins.

7. The apparatus of claim 6, wherein the optimizer is to divide a range of index keys of endpoint pairs into a plurality of sub-ranges to determine the plurality of bins.

8. The apparatus of claim 6, wherein the optimizer is to divide data record counts of a histogram corresponding to a bin by a desired number of record counts in each quantile to determine the plurality of quantiles of the bins.

9. The apparatus of claim 6, wherein the data pre-processor further comprises a workload generator coupled with the optimizer to populate the plurality of workloads, based on the determined bins and quantiles of the bins.

10. The apparatus of claim 9, wherein the workload generator is to populate the plurality of workloads with time series amount of transmission data of the IP address pairs.

11. The apparatus of claim 10, wherein the workload generator is to further transform the time series amount of transmission data of the IP address pairs into directional time series amount of transmission data of the IP address pair.

12. The apparatus of claim 10, further comprising the one or more analyzers.

13. The apparatus of claim 12, wherein the one or more analyzers is to generate a plurality of graphics analytics for the IP address pairs, based at least in part on the time series amount of transmission data in the workloads, for signal or pattern analysis.

14. A method for managing networking, comprising:
receiving, by a computing device, a collection of netflow data from a source IP address to a destination IP address of a network; and
partitioning, by the computing device, the collection of netflow data into a plurality of workloads of signed time series data of IP address pairs, with signs of the time series data of IP address pairs denoting direction of transmission;
wherein partitioning comprises partitioning the netflow data into a plurality of bins, where each bin includes a plurality of quantiles of the IP address pairs, and generating a matrix of index keys for the IP address pairs, and a matrix of partition key pairs for the index keys, based at least in part on a training data set derived from the collection of netflow data; and
wherein the bins are analyzed to assist in managing the network, with at least a plurality of the bins analyzed in parallel.

15. The method of claim 14, further comprising analyzing the bins, with at least a plurality of the bins analyzed in parallel.

16. One or more computer-readable medium having stored therein a plurality of instructions to cause a computing device, in response to execution of the instructions by the computing device, to:
receive a collection of netflow data from a source IP address to a destination IP address of a network; and
partition the collection of netflow data into a plurality of workloads of signed time series data of IP address pairs, with signs of the time series data of IP address pairs denoting direction of transmission;
wherein partition comprises partition of the netflow data into a plurality of bins, where each bin includes a plurality of quantiles of the IP address pairs, and generation of a matrix of index keys for the IP address pairs, and a matrix of partition key pairs for the index keys, based at least in part on a training data set derived from the collection of netflow data; and
wherein the bins are analyzed to assist in managing the network, with at least a plurality of the bins analyzed in parallel.

17. The computer-readable medium of claim 16, wherein generation comprises generation of the index keys based on attributes of the IP address pairs, and generation of the partition key pairs from selected portions of the attributes of the IP address pairs.

18. The computer-readable medium of claim 16, wherein an IP address pair comprises an amount of data transmitted from a source IP address to a destination IP address.

19. The computer-readable medium of claim 18, wherein the IP addresses are IPV6 addresses, and generating comprises generating a matrix of 256-bit index keys from the IPV6 addresses of the IPV6 address pair, using the IPV6 addresses of the IPV6 address pair as unsigned 128-bit integers; and wherein an IPV6 address comprises a plurality of ordered parts, and generating further comprises generating a matrix of partition key tuples, from highest and lowest ordered parts of the IPV6 addresses of the IPV6 address pair.

20. The computer-readable medium of claim 16, wherein partition includes determination of the plurality of bins, and the plurality of quantiles of the bins.

21. The computer-readable medium of claim 20, wherein determination comprises division of a range of index keys of endpoint pairs into a plurality of sub-ranges to determine the plurality of bins; and division of data record counts of a histogram corresponding to a bin by a desired number of record counts in each quantile to determine the plurality of quantiles of the bins.

22. The computer-readable medium of claim 20, wherein partition includes population of the plurality of workloads, based on the determined bins and quantiles of the bins.

23. The computer-readable medium of claim 22, wherein an IP address pair comprises an amount of data transmitted from a source IP address to a destination IP address; wherein an endpoint pair comprises a pair of IP addresses; and wherein the computing device is further caused to populate the plurality of workloads with time series amount of transmission data of the IP address pairs; and wherein a workload generator is to further transform the time series amount of transmission data of the IP address pairs into directional time series amount of transmission data of the IP address pair.

* * * * *